United States Patent Office 2,774,431
Patented Dec. 18, 1956

2,774,431

METHOD FOR INCREASING PRODUCTION FROM WELLS

John E. Sherborne, Whittier, Calif., assignor to Union Oil Company of California, Los Angeles, Calif., a corporation of California No Drawing. Application August 25, 1954, Serial No. 452,229

15 Claims. (Cl. 166—22)

This invention relates to a method for increasing the productivity of oil and gas wells, and in particular concerns an improved method for hydraulically fracturing producing formations penetrated by a well bore to increase the permeability of such formations with consequent increase in the productivity of the well.

Within recent years the so-called "Hydrafrac" and similar hydraulic fracturing processes for increasing the productivity of oil and gas wells have met with considerable commercial success. In general, such processes consist in forcing a viscous or "low-penetrating" fluid, e. g. gelled gasoline, into the producing formation under sufficient pressure to overcome the overburden pressure and produce fractures within the formation. The low-penetrating fluid which has been so forced into the formation and which fills the fractures is then treated in one way or another, e. g., with peptizing agents, so as to effect a reduction in its viscosity and allow it to be withdrawn from the formation and out of the borehole as a relatively thin liquid. In order to keep the fractures open after the pressure has been released and the fracturing fluid has been removed, finely-divided insoluble solids are suspended in the low-penetrating fluid. Such solids are carried into the fractures by the fluid and when the latter is reduced in viscosity and withdrawn they are deposited within the fractures and act as props to keep the fractures open after the pressure is released. Substantially any finely-divided insoluble solid material may be employed as a propping agent in this manner, although Ottawa silica sand of about 20 to 30 mesh particle size is most widely used.

As stated, the above-described fracturing process has received considerable commercial application and in some localities has achieved highly satisfactory results in increasing the productivity of wells. However, in many cases the operation is entirely unsuccessful or does not achieve permanent results; in the latter instance the productivity of the well eventually declines to the level which existed prior to the fracturing treatment and often cannot be restored to any great extent by repeating the operation.

I have now found that the nature of the propping agent, particularly the particle size thereof, is a very important factor in the success of the fracturing operation. More particularly, I have found that in many cases the propping agents which have been heretofore employed have been of such a particle size that they do not maintain the fracture open, but conform to the fracture in such a manner as to become indistinguishable therefrom. This is particularly true in the more friable formations where the formation more or less gradually enfolds around the particles of the propping agent so that eventually the fracture becomes closed. I have further found that these difficulties can be overcome to a large extent by employing a sequence of steps in which there is initially employed a propping agent having a particle size substantially smaller than that heretofore provided, e. g. 40 mesh or smaller, and in subsequent steps employing propping agents having a somewhat larger particle size, e. g., 20–30 mesh.

The invention thus consists in a process wherein an initial hydraulic fracturing operation is carried out employing a low penetrating fluid having suspended therein a particulate solid propping agent of relatively small particle size and thereafter repeating the operation one or more times employing in each instance a propping agent having a particle size greater than that employed in the preceding treatment. For example, in proceeding in accordance with one embodiment of the present invention, an initial fracturing treatment may be carried out employing a jelled gasoline fracturing fluid containing suspended 80 mesh sand as the propping agent. When the increased well productivity achieved by such initial treatment declines, a second fracturing operation is carried out employing a fracturing fluid containing 40 mesh sand as the propping agent. Should a third treatment eventually prove desirable or necessary it is carried out with a fracturing fluid containing 20 mesh sand as the propping agent. In accordance with another embodiment of the invention, repeated fracturing operations are carried out without intervening production periods, each treatment being carried out employing a propping agent having a particle size greater than that employed in the preceding treatment. By means of such technique, I have found that the permeability of an oil sand may be increased by as much as about 40 times as compared to only about 8 times when the same number of treatments are effected without increasing the particle size of the propping agent.

The following experimental operations and data illustrate the nature of the process of the invention and the advantages attained thereby:

In each experiment, a core sample 2" in diameter and 4" long was split in half lengthwise along a bedding plane. The two halves were then placed together and the entire core was embedded in Lucite in such manner that the end faces of the core were covered with a ½" layer of the Lucite but the lateral surfaces were covered by only a very thin layer of the same. Tapped holes were provided in the end faces of the Lucite block communicating with the line of fracture in the core, receiving pressure fittings and conduits through which a fracturing fluid could be directed against the end face of the core and into the fracture. The core assembly was then submerged in a body of hydraulic oil maintained under a pressure of about 500 p. s. i. in a suitable pressure vessel. Such pressure simulated the overburden pressure on the core in its natural state. The entire assembly was maintained at a temperature of 150° F. in a constant temperature oven. In each experiment, the initial permeability of the core with respect to kerosene was determined at 250 p. s. i. and expressed as a flow rate in terms of volume of kerosene passed through the core in unit time, after which it was subjected to a series of hydraulic fracturing operations. Each operation was carried out by forcing the fracturing fluid into the core at preselected rates and under preselected pressures in excess of the 500 p. s. i. overburden pressure so that the two halves of the core were forced apart along the line of the initial fracture and against the simulated overburden pressure. After approximately 150 ml. of the fracturing fluid had been forced into and through the core, a gel breaking fluid was forced through the core and the pressure was released. When the pressure had been released, the fracture was held open by the propping agent which had been incorporated in the fracturing fluid and which deposited out of the fluid in the fracture when the gel was broken and withdrawn. The core was then back-flowed with kerosene under about 250 p. s. i. and its permeability determined as before. Each successive fracturing operation was carried out in the same manner, and after each operation the permeability of the fractured core was ascertained. The fracturing fluid employed was a commercial jellied gasoline type product ("Nuodex") containing about 0.05 lb./gal. of sand as a propping agent. The gel breaker employed was a commercial amine solution. The following data were obtained on several different cores employing propping agents of different particle size:

| Expt. No. | Core source | Fracturing operation | Particle Particle size of propping agent | Fracturing pressure, p. s. i. | Flow rate after fracture, ml./min. | Cumulative increase in permeability |
|---|---|---|---|---|---|---|
| 1 | Dominguez, Calif.; 8648' in 8th zone; initial flow rate=0.3 ml./min. | First | 100-mesh | 800 | 9.0 | 30 X |
|  |  | Second | 80-mesh | 1,800 | 33 | 110 X |
| 2 | Santa Fe Springs, Calif.; 11,300'; initial flow rate=0.76 ml./min. | First | 100-mesh | 1,800 | 9.7 | 13 X |
|  |  | Second | 80-mesh | 1,800 | 23 | 30 X |
|  |  | Third | 60-mesh | 1,800 | 30 | 39 X |
| 3 | Santa Fe Springs, Calif.; 11,300'; initial flow rate=2.0 ml./min. | First | 100-mesh | 1,800 | 1.6 | 0.8 X |
|  |  | Second | 60-mesh | 1,800 | 33 | 16 X |
|  |  | Third | 30-mesh | 1,800 | 37 | 18 X |
| 4 | Dominguez, Calif.; 8631' in 8th zone; initial flow rate=9.4 ml./min. | First | 80-mesh | 1,000 | 76 | 8 X |
|  |  | Second | do | 1,000 | 67 | 7 X |
|  |  | Third | do | 1,000 | 87 | 9 X |

In carrying out a multiple fracturing operation in accordance with the process of the invention, any of the known fracturing fluids may be employed. For the most part, such fluids take the form of hydrocarbon gels obtained by dispersing a suitable gelling agent in a relatively light hydrocarbon such as gasoline, kerosene or even light crudes. Commonly employed gelling agents include aluminum naphthenate and mixtures thereof with aluminum oleate, hydroxy aluminum soaps of tall oil and fatty acids, aluminum and other metal soaps of various fatty acids derived from coconut oil, peanut oil, etc., organophilic colloids, and the like. The use of such agents to prepare suitable hydrocarbon gels is well understood in the hydraulic fracturing art, and the particular technique involved, e. g., proportions, mixing temperature, etc., depends somewhat upon the particular gelling agent employed. A number of agents specifically formulated for preparing fracturing gels are available commercially, e. g., "Nuodex," and their manner of use is clearly described by the manufacturer. Aqueous fracturing fluids may also be employed in locations where the producing formations are not damaged by water. Gelled acids may also be employed, and in some instances more or less heavy crudes alone may be used. The essential requirement of the fracturing fluid is primarily one of suitable viscosity rather than one of chemical composition, and any inert fluid of satisfactory viscosity may be successfully employed. The viscosity should be between about 30 and about 5000 centipoises (Stormer @ 600 R. P. M.) and is preferably between about 75 and about 300 centipoises.

The propping agent is preferably sand, although any inert solid material which is insoluble in the formation fluids, the fracturing fluid and the viscosity reducer or gel breaker may be employed. The amount of propping agent provided may be varied between wide limits in accordance with conventional practice, e. g., from as little as about 0.05 lb./gal. to as much as about 10 lbs./gal. of fracturing fluid. Recent practice in the art indicates a growing preference for the use of a relatively large proportion of the propping agent, e. g., 5–10 lbs./gal. In accordance with the invention, the particle size of the propping agent is progressively increased as the process proceeds. For the initial fracturing operation, the particle size may suitably be 80–100 mesh where the process is applied to relatively tight formations, with a decrease of, say, at least 20 mesh units in each succeeding operation. Thus, the initial fracture may be carried out employing 80–100 mesh sand as the propping agent, the second fracture may be carried out with 60–80 mesh sand, a third fracture with 40–60 mesh sand, etc. Where the formation to be treated is relatively loose, e. g., one having an initial permeability of 50 md. or greater, the initial fracturing operation is suitably effected with 40–60 mesh sand, the second with 20–30 mesh sand, etc. The optimum initial particle size and the extent by which it is increased in each fracturing operation depends upon the permeability of the formation prior to each operation and also upon the overburden pressure, and is determined in accordance with the principles applied in single stage hydraulic fracturing.

The operational and manipulative techniques employed in the fracturing process of the invention are essentially the same as those heretofore employed. The formation to be treated is isolated by means of high pressure packers inserted in the bore and/or the well casing, and the initial charge of fracturing fluid containing the propping agent in suspended form is introduced into the bore, usually via the well tubing. The fracturing fluid is followed by a charge of crude oil or other suitable liquid, which follow-up liquid is continuously pumped down the tubing until the overburden pressure is exceeded and fracture occurs. The latter is indicated by a sudden decrease in the pump pressure. Further pumping forces the fracturing fluid and propping agent farther into the fractured formation and lengthens the fractures. In a typical operation, the pressure required to force the fluid down the tubing may rise rapidly to, say, 2500 p. s. i. over a period of 5–10 minutes, level off at this value for 30 minutes while the fracturing fluid is being forced into the formation, rise rapidly so, say, 3400 p. s. i. over a period of 2–5 minutes, and then decline more or less rapidly to, say, 2000 p. s. i. and remain at such value while the fracture is being extended. The required rate of pumping can be calculated from the well depth, viscosity of the fracturing fluid, formation thickness and permeability, and the overburden pressure. When the fracturing fluid is a self-reverting gel, e. g. "Napalm" which reverts from a gel to a low viscosity sol upon the mere passage of time or upon contact with the well fluids, no viscosity-reducing or gel breaking agent need be introduced into the fractured formation. The gel is simply allowed to remain in the formation under pressure until it liquifies of its own accord or as a result of contacting the well fluids, and upon putting the well back in production it will be displaced from the formation by the flow of oil therethrough and be withdrawn from the well along with the well effluent, leaving the propping agent behind to keep the hydraulically induced fractures from closing. Usually, however, a gel breaker is employed to reduce the viscosity of the gel and/or to cause its liquification, and in such cases the follow-up charge will comprise the gel breaker and is often in turn followed up by a charge of suitable liquid. The gel breaker may comprise salt brine, aqueous mineral acid, amine solutions, oil-soluble petroleum sulfonates, etc. In some instances a small charge of crude oil or other suitable liquid may be interposed between the gel and the gel breaker. When the action of the gel breaker has become complete and the viscosity of the fracturing fluid thereby reduced to a value of the same order of magnitude as that of the well fluid, the pressure is released and the well placed in production, whereupon the fracturing fluid and gel breaker will be withdrawn from the well as part of the well effluent. Subsequent fracturing operations are carried out in the same manner except that in each of such operations a propping agent of larger particle size is employed. In some instances, the initial fracturing operation will effect a material increase in oil production, and it will not be desired to carry out a second operation with a larger size propping agent until the production has declined to some extent. In other cases, however, the production increase attained by a single fracturing operation may not be commercially significant, and the second fracturing operation will be carried out more or less immediately after the first. Similarly, a third treatment may succeed the second more or less immediately or with an intervening production period.

In general, any of the various known hydraulic fracturing techniques and combinations thereof with other types of well treatments, e. g., acidizing, swabbing, washing, heating, etc., may be applied to the practice of the present invention. Essentially, the invention consists in subjecting a subterranean formation to a plurality of hydraulic fracturing treatments with a viscous low-penetrating fracturing fluid containing a granular propping agent, the particle size of which is increased with each succeeding treatment, rather than in the use of any particular fracturing fluid or any particular means or manner of effecting the fracturing operation itself.

Other modes of applying the principle of the invention may be employed instead of those explained, change being made as regards the methods or materials employed provided the step or steps stated by any of the following claims, or the equivalent of such stated step or steps, be employed.

I, therefore, particularly point out and distinctly claim as my invention:

1. In a process for increasing the productivity of a subterranean oil-producing formation penetrated by a well bore wherein (1) a viscous fluid containing a particulate solid propping agent is forced down said well and into said formation under a pressure sufficient to fracture said formation, (2) said fluid is thereafter withdrawn from the fractures so formed leaving said propping agent deposited within said fractures, (3) said well is thereafter placed in producing condition, and (4) said sequence of steps is repeated one or more times, the improvement which consists in increasing the particle size of said propping agent in each succeeding fracturing step.

2. In a process for increasing the productivity of a subterranean oil-producing formation penetrated by a well bore wherein (1) a viscous hydrocarbon gel containing a particulate solid propping agent is forced down said well and into said formation under a pressure sufficient to fracture said formation, (2) said hydrocarbon gel is thereafter reduced in viscosity and withdrawn from the fractures so formed leaving said propping agent deposited within said fractures, (3) said well is thereafter placed in producing condition, and (4) said sequence of steps is repeated one or more times, the improvement which consists in increasing the particle size of said propping agent in each succeeding fracturing step.

3. The process of claim 2 wherein the propping agent is sand.

4. The method of increasing the productivity of an oil-producing formation penetrated by a well bore which comprises forcing a viscous fluid containing a particulate solid propping agent down said well and into said formation under sufficient pressure to fracture said formation; withdrawing said fluid from the fractures so formed leaving said propping agent deposited within said fractures and said well in producing condition; and repeating said sequence of steps at least one more time, the particle size of said propping agent being substantially increased in each succeeding fracturing step.

5. The method of increasing the productivity of an oil-producing formation penetrated by a well bore which comprises forcing a fracturing medium comprising a viscous hydrocarbon gel and a particulate solid propping agent down said well and into said formation under sufficient pressure to fracture said formation; reducing the viscosity of the fluid which occupies the fractures so formed; withdrawing the fluid of lowered viscosity from said fractures leaving said propping agent deposited within said fractures and said well in producing condition; and repeating said sequence of steps at least one more time, the particle size of said propping agent being increased in each succeeding fracturing step.

6. The method of claim 5 wherein the fracturing medium comprises a light petroleum hydrocarbon, sufficient of a metal soap gelling agent to impart to said medium a viscosity of at least about 30 centipoises, and sand as the said propping agent.

7. The method of claim 5 wherein the particle size of the propping agent employed in the initial fracturing step is at least about 40 mesh, and in each succeeding fracturing step is increased by at least 10 mesh units.

8. The method of increasing the productivity of an oil-producing formation penetrated by a well bore which comprises forcing a charge of viscous fluid containing a particulate solid propping agent into said formation under a pressure sufficient to fracture said formation; withdrawing said fluid from the fractures so produced leaving said propping agent deposited in said fractures; producing well fluids from the formation so treated until the volume of said well fluids produced per unit time declines to a pre-selected value; forcing a second charge of viscous fluid containing a particulate solid propping agent into said formation under sufficient pressure to fracture said formation, the particle size of said propping agent in said second charge being substantially larger than that of the propping agent in said first charge; withdrawing said fluid from the fractures so produced; and producing well fluids from the formation.

9. The method of claim 8 wherein the particle size of the propping agent employed in the first charge of viscous fluid is at least about 40 mesh, and the particle size of the propping agent employed in the second charge of viscous fluid is at least about 10 mesh units larger than that of the propping agent employed in the first charge of viscous fluid.

10. The method of claim 8 wherein the said viscous fluid comprises a light petroleum hydrocarbon and sufficient of a metal soap gelling agent to impart to the fluid a viscosity of at least about 75 centipoises, and a liquid capable of reducing the viscosity of the fracturing fluid is in each instance forced into the fractures prior to withdrawal of the viscous fluid therefrom.

11. The method of increasing the productivity of an oil-producing formation penetrated by a well bore which comprises isolating a portion of said bore adjacent said formation; introducing into the isolated portion of the bore a fracturing medium comprising a viscous fluid and a particulate solid propping agent; pumping additional liquid into the bore after said fracturing medium under sufficient pressure to force said fracturing medium into said formation and form fractures therein; withdrawing said additional liquid and said viscous fluid from the well and leaving said propping agent deposited within the fractures so formed; producing well fluids from the formation so treated until the volume of said well fluids produced per unit time declines to a pre-selected value; and repeating the foregoing steps in sequence, employing a fracturing medium in which the particle size of the said propping agent is substantially larger than that of the propping agent initially employed.

12. The method of claim 11 in which the portion of the well bore adjacent to the formation to be treated is isolated by means of at least one packer set on the well tubing and the fracturing medium and additional liquid is introduced into said isolated portion via the well tubing.

13. The method of claim 11 in which the said additional liquid comprises a material capable of reducing the viscosity of the said viscous fluid.

14. The method of claim 11 in which the said viscous fluid comprises a light petroleum hydrocarbon and sufficient of a metal soap gelling agent to impart to the fluid a viscosity of at least about 75 centipoises, and the said additional liquid comprises a material capable of reducing the viscosity of the said viscous fluid upon the passage of time.

15. The method of increasing the productivity of an oil-producing formation penetrated by a well bore which comprises isolating a portion of the bore adjacent said formation by placing at least one packer on the well tubing; introducing into the well tubing a fracturing medium comprising a light petroleum hydrocarbon, sufficient of a metal soap gelling agent to impart to the said medium a viscosity of at least about 75 centipoises, and between about 0.05 and about 10 lbs./gal. of sand having a particle size of at least about 40 mesh; introducing a gel-breaking liquid into the well tubing above the fracturing medium; introducing an inert liquid into the well tubing above the gel-breaking liquid; applying sufficient pressure on the fluids so introduced into the well tubing to force the fracturing medium and at least part of the gel-breaking liquid into the formation and fracture the same, thereby forming channels therein; maintaining pressure on the fluids within the formation until the viscosity of the fracturing medium is reduced by the action of the gel breaker thereon and the sand is deposited within said channels; reducing the pressure and withdrawing well fluids from the formation so treated until the volume of said well fluids produced per unit time declines to a pre-selected value; and repeating the aforesaid sequence of operations employing a fracturing medium containing sand of substantially larger particle size than that initially employed.

References Cited in the file of this patent
UNITED STATES PATENTS

| | | |
|---|---|---|
| 2,354,570 | Benckenstein | July 25, 1944 |
| 2,596,843 | Farris | May 13, 1952 |